(12) United States Patent
Anthony et al.

(10) Patent No.: US 7,810,220 B2
(45) Date of Patent: Oct. 12, 2010

(54) COUPLING DEVICE

(75) Inventors: James R. Anthony, Carmel, IN (US); Guy R. Dingman, Westfield, IN (US)

(73) Assignee: Indiana Mills & Manufacturing Inc., Westfield, IN (US)

(*) Notice: Subject to any disclaimer, the term of this patent is extended or adjusted under 35 U.S.C. 154(b) by 0 days.

(21) Appl. No.: 10/825,769

(22) Filed: Apr. 16, 2004

(65) Prior Publication Data
US 2004/0208692 A1    Oct. 21, 2004

Related U.S. Application Data

(60) Provisional application No. 60/463,838, filed on Apr. 18, 2003.

(51) Int. Cl.
*A44B 13/00* (2006.01)
(52) U.S. Cl. ............... 24/599.1; 24/599.4; 24/599.7
(58) Field of Classification Search ........... 24/599.1, 24/599.4, 599.6, 599.7, 601.5, 601.7, 599.5; 119/792, 795, 797–799, 863; 292/95, 96, 292/108, 121, 219, 296, 304, DIG. 61
See application file for complete search history.

(56) References Cited

U.S. PATENT DOCUMENTS

| | | | | |
|---|---|---|---|---|
| 731,707 A * | 6/1903 | Putnam | | 24/599.7 |
| 816,218 A * | 3/1906 | Clay | | 280/510 |
| 1,273,717 A * | 7/1918 | Anderson | | 24/599.7 |
| 1,474,141 A * | 11/1923 | Burkett | | 24/601.5 |
| 1,646,745 A | 10/1927 | Carpmill | | |
| 2,549,841 A | 4/1951 | Morrow et al. | | |
| 2,637,088 A | 5/1953 | Foster | | |
| 2,856,663 A | 10/1958 | Elsnert | | |
| 2,938,254 A | 5/1960 | Gaylord | | |
| 3,040,404 A | 6/1962 | Boger, Sr. | | |
| 3,083,431 A * | 4/1963 | Lewis | | 24/599.7 |
| 3,128,520 A | 4/1964 | Carter et al. | | |
| 3,405,966 A * | 10/1968 | Bernard | | 24/599.7 |

(Continued)

FOREIGN PATENT DOCUMENTS

DE        33 36 115        4/1985

(Continued)

OTHER PUBLICATIONS

"SafeGuard Child Protection, Seat Attachment Systems" brochure, IMMI, 2001, 5 pages.

(Continued)

*Primary Examiner*—Victor MacArthur
(74) *Attorney, Agent, or Firm*—Barnes & Thornburg LLP

(57) ABSTRACT

A coupling device for engagement with an anchor member is provided. The coupling device includes a lever that moves between a closed position that substantially covers the mouth of the device and an open position in which the mouth is substantially uncovered by the lever. The lever may be moved to the open position by camming forces or by direct manipulation of a portion of the lever by a user. The coupling device may include a cover with a recognizable shape such as a pet or fictional character. The protruding ears and/or head of the recognizable shape aid in the gripping and operation of the device and the mouth receives the anchor member.

16 Claims, 8 Drawing Sheets

U.S. PATENT DOCUMENTS

| | | | |
|---|---|---|---|
| 3,414,947 A | | 12/1968 | Holmberg et al. |
| 3,540,091 A | | 11/1970 | Marosy |
| 4,136,422 A | | 1/1979 | Ivanov et al. |
| 4,184,234 A | | 1/1980 | Anthony et al. |
| 4,376,383 A | * | 3/1983 | Wolter |
| 4,434,536 A | * | 3/1984 | Schmidt et al. ............ 24/599.4 |
| 4,525,901 A | | 7/1985 | Krauss |
| 4,660,889 A | | 4/1987 | Anthony et al. |
| 4,689,860 A | | 9/1987 | Suchowski |
| 4,876,770 A | | 10/1989 | Bougher |
| 4,919,484 A | | 4/1990 | Bougher et al. |
| 5,031,962 A | | 7/1991 | Lee |
| 5,377,386 A | | 1/1995 | Griffith |
| 5,471,714 A | | 12/1995 | Olson |
| 5,487,588 A | | 1/1996 | Burleigh et al. |
| 5,551,380 A | * | 9/1996 | Hodgson .................... 119/795 |
| 5,669,663 A | | 9/1997 | Feuerherdt |
| 5,695,243 A | | 12/1997 | Anthony et al. |
| 5,774,947 A | | 7/1998 | Anscher |
| 5,878,698 A | * | 3/1999 | Lyell .......................... 119/863 |
| 5,890,762 A | | 4/1999 | Yoshida |
| 5,915,630 A | | 6/1999 | Step |
| 5,952,925 A | * | 9/1999 | Secker ........................ 119/859 |
| 5,979,982 A | | 11/1999 | Nakagawa |
| 6,178,923 B1 | * | 1/2001 | Plotkin ....................... 119/719 |
| 6,209,957 B1 | | 4/2001 | Baloga et al. |
| 6,374,778 B1 | * | 4/2002 | Glussich .................... 119/859 |
| 6,425,632 B1 | | 7/2002 | Anthony et al. |
| 6,494,535 B2 | | 12/2002 | Galbreath |
| 6,820,310 B2 | | 11/2004 | Woodard et al. |
| 6,962,394 B2 | | 11/2005 | Anthony et al. |
| 2001/0022160 A1 | | 9/2001 | Donze |
| 2002/0011219 A1 | * | 1/2002 | Chien ......................... 119/859 |
| 2003/0030310 A1 | * | 2/2003 | Anthony et al. .......... 297/250.1 |

FOREIGN PATENT DOCUMENTS

| | | |
|---|---|---|
| DE | 198 48 231 | 8/1999 |
| EP | 0 619 201 A1 | 10/1994 |
| EP | 0 619 202 A1 | 10/1994 |
| EP | 0982182 | 3/2000 |
| EP | 1059194 | 12/2000 |
| GB | 367 046 A | 2/1932 |

OTHER PUBLICATIONS

"SafeGuard Child Seat Attachment Systems", IMMI, 1999, 2 pages.
"SafeGuard Buckle Up With Confidence", IMMI, 2002, 13 pages.

* cited by examiner

COUPLING DEVICE

This application claims the benefit of and priority to U.S. provisional patent application No. 60/463,838, filed 18 Apr. 2003.

FIELD OF THE INVENTION

This invention relates to connectors or coupling devices and more particularly to coupling devices for attaching to an anchor member.

BACKGROUND AND SUMMARY OF THE INVENTION

This invention relates generally to coupling devices for attaching to an anchor member. Such a coupling may be equipped with any manner of elongated members such as for example and without limitation a tether, a leash a web, a wire, or a rope. So, for example, the coupling device may be releasably engaged or coupled at one end with an anchor member on a collar worn by an animal and engaged or coupled at the other end with a leash, the leash being tended by a human.

It is desirable to provide a coupling device configured to releasably engage an anchor member. Such a coupling device may be released even if release is being resisted, say for example and without limitation by an animal pulling at its leash as a user tries to disengage the coupling device at the end of the leash from the anchor member on the animal's collar. A coupling device is provided generally comprising a lever or locking member having a locking appendage or tooth located at the lever's distal end. The lever, which may or may not be monolithic, illustratively is movably mounted within a housing or cover. The cover may define a recognizable shape such as an animal, a human, an inanimate object, a fictitious being and the like. For example, the cover may resemble the head of a dog, any dog. No matter what the cover is shaped to resemble, it may have protrusions to aid in gripping and identification of the coupling device. For example, in the case of a dog head, the cover may have anatomically correct or representative protrusions such as ears, eyes, top of head or forehead and the like. These protrusions aid in gripping the coupling device while disengaging or engaging it with an anchor member. The cover also defines a mouth that resembles the mouth of the animal, and is configured to receive the anchor member. The coupling device could also be coupled with other objects, such as a set of keys. The cover could also be equipped with sound or illumination devices and may be colored. The cover's color may be any color or combination of colors. For example, the cover could have a fanciful color like blue, or it could be realistic such that a cover shaped like a Golden retriever head might have a black nose, brown eyes, and fawn or golden colored fur.

The lever may pivot about a mounting member relative to the cover in order to close or open the mouth. In the closed position, the tooth substantially covers the mouth and retains an anchor member therein. The lever may be biased into the closed position by a bias member, such as for example a spring. In the open position, the tooth is substantially withdrawn from the mouth such that it is substantially open or uncovered to allow the insertion or extraction of the anchor member from the mouth. The pivot point of the lever may be located near the proximate end of the lever, or it may be located between the lever's proximate and distal ends. The leading or engagement edge of the lever may be angled to allow it to be moved or pivoted about the mounting member by engaging another structure, such as a rigid anchor member, which causes the lever to move through camming. The lever also may be moved to the open position by direct manipulation of the lever. Having a generally S-Shaped lever that pivots near the proximate end of the lever allows the direct manipulation portion to be located between the lever's distal and proximate ends or even toward or at the proximate end if desired. With this arrangement, a user may grasp the gripping protrusions, such as ears, eyes, forehead, of the cover and apply pressure against the direct manipulation portion in order to overcome the bias force and move the lever into the open position. The lever may also be moved through internal forces, such as camming forces. In such a case a camming pin or member inside the cover might impinge upon a camming portion of the lever when a force is applied to a suitable structure to move the camming pin. Such a suitable structure might be a button.

The coupling device may further comprise a frame assembly sized to fit within the cover and sized to nestle and mount the lever. The coupling device may further comprise a mounting assembly including an anchorage. The anchorage may be configured to couple with any suitable elongate member. The elongate member may be any suitable flexible, semi-flexible, semi-rigid or rigid member, and may be for example a leash, a tether, a web, a rope, a wire, a tube and the like without limitation. The mounting assembly may be detachable from the coupling device. So, for example, the coupling device may remain coupled to the anchor member on a pet's collar while the mounting assembly may be detached along with a leash that is attached to the anchorage. The anchorage may move about a longitudinal axis through an anchorage mount carried on the mounting assembly. The elongate member may be permanently, semi-permanently or releasably coupled to the anchorage through any suitable structure or method, such as for example and without limitation, sewing, snapping, clipping, riveting, gluing, hook and looping, bracketing, sliding association, and the like or any combination of the foregoing.

Each of the cover, the frame assembly, the lever, and the mounting assembly may, but need not be of monolithic construction. So too, a cover and frame assembly combination may but need not be of monolithic construction; a frame and mounting assembly combination may but need not be of monolithic construction; a cover and mounting assembly combination may but need not be of monolithic construction; and a cover, frame assembly and mounting assembly combination may but need not be of monolithic construction. In the event that the above combinations are not monolithic, then they may be coupled together using any suitable fastener device or means, such as bolts, rivets, screws, glue, cement, weld, solder, and the like without limitation. So too, the cover may be snapped onto the frame and/or mounting assembly and vice versa. So too, a combination of monolithic construction and fastening devices or methods may be used. Each of the cover, the lever, the frame assembly, and the mounting assembly may be fashioned from any suitable metallic, non-metallic, or composite material or combination thereof by any method of manufacture suitable for the material or combination of materials used.

DESCRIPTION OF THE ILLUSTRATIVE EMBODIMENTS

Figure 1:
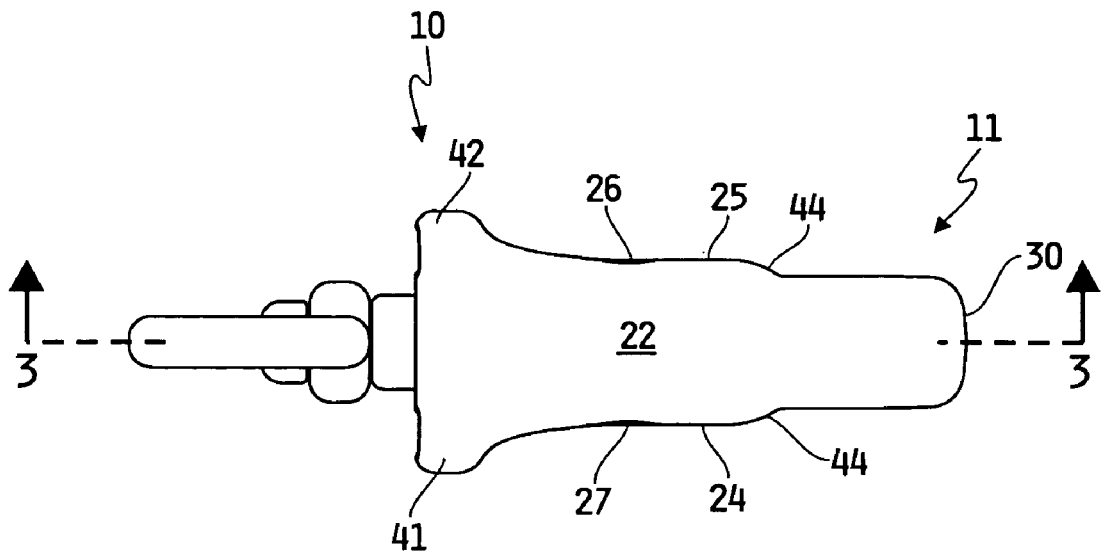
FIG. 1 is a top plan view of one illustrative embodiment of the present disclosure.
Figure 2:
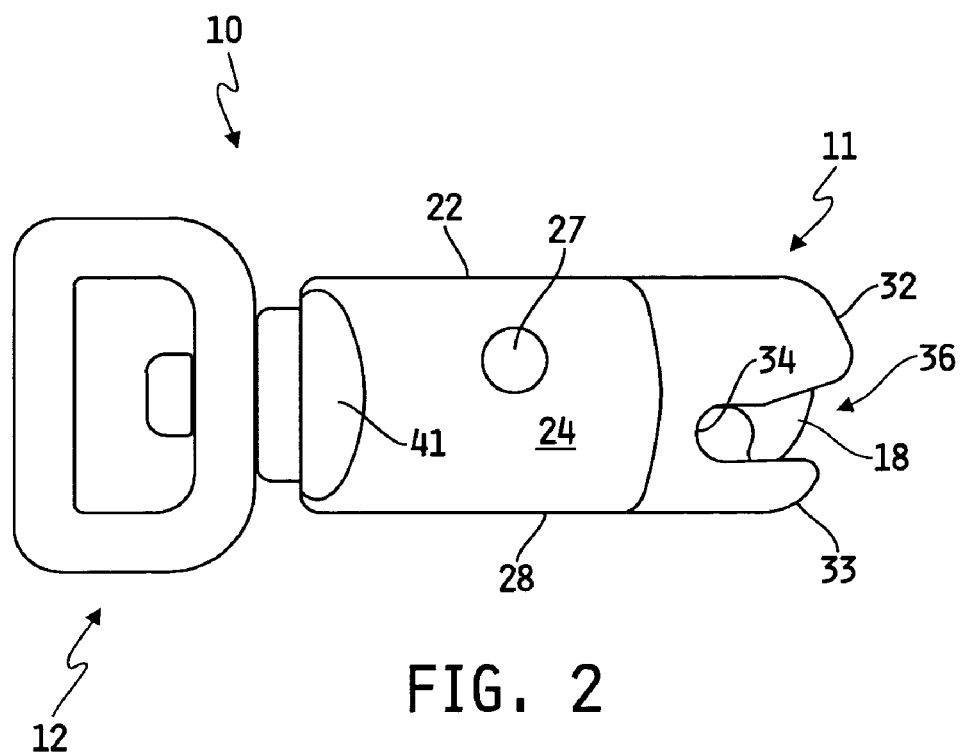
FIG. 2 is a side elevation view of the illustrative embodiment of FIG. 1 in the closed position.

For the purpose of promoting an understanding of the principles of this invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein are contemplated as would normally occur to one of average skill in the art to which the invention relates.

Referring to FIGS. 1-5, an illustrative coupling device 10 is depicted. Referring to FIGS. 6-10, another illustrative coupling device 110 is depicted. The illustrated coupling devices 10, 110 are structurally and functionally similar to each other. Accordingly, like numerals are used to identify like components described in conjunction with connector devices 10, 110. Components of device 110 which are similar to components of device 10 will have numerals which differ from the numerals of the similar device 10 components by a factor of 100.

Coupling device 10, 110 generally comprises a housing or cover 11, 111, a mounting assembly 12, 112, a frame assembly 13, 113, a locking or lever member 14, 114, and a biasing member 69, which in the illustrative embodiments is a spring, for example a helical or a coiled compression spring. It will be appreciated that any of the housing 11, 111, mounting assembly 12, 112 and frame assembly 13, 113 may be eliminated or combined with each other. For example, the lever 12, 112 may be movably mounted relative to the housing without any need for a frame assembly. The coupling device 10, 110 may be combined with any manner of flexible, semi-flexible, semi-rigid or rigid elongate members or tethers, such as for example and without limitation, a web, a rope, a wire and the like as will be explained further herein below and depicted in FIG. 10.

Figure 9:
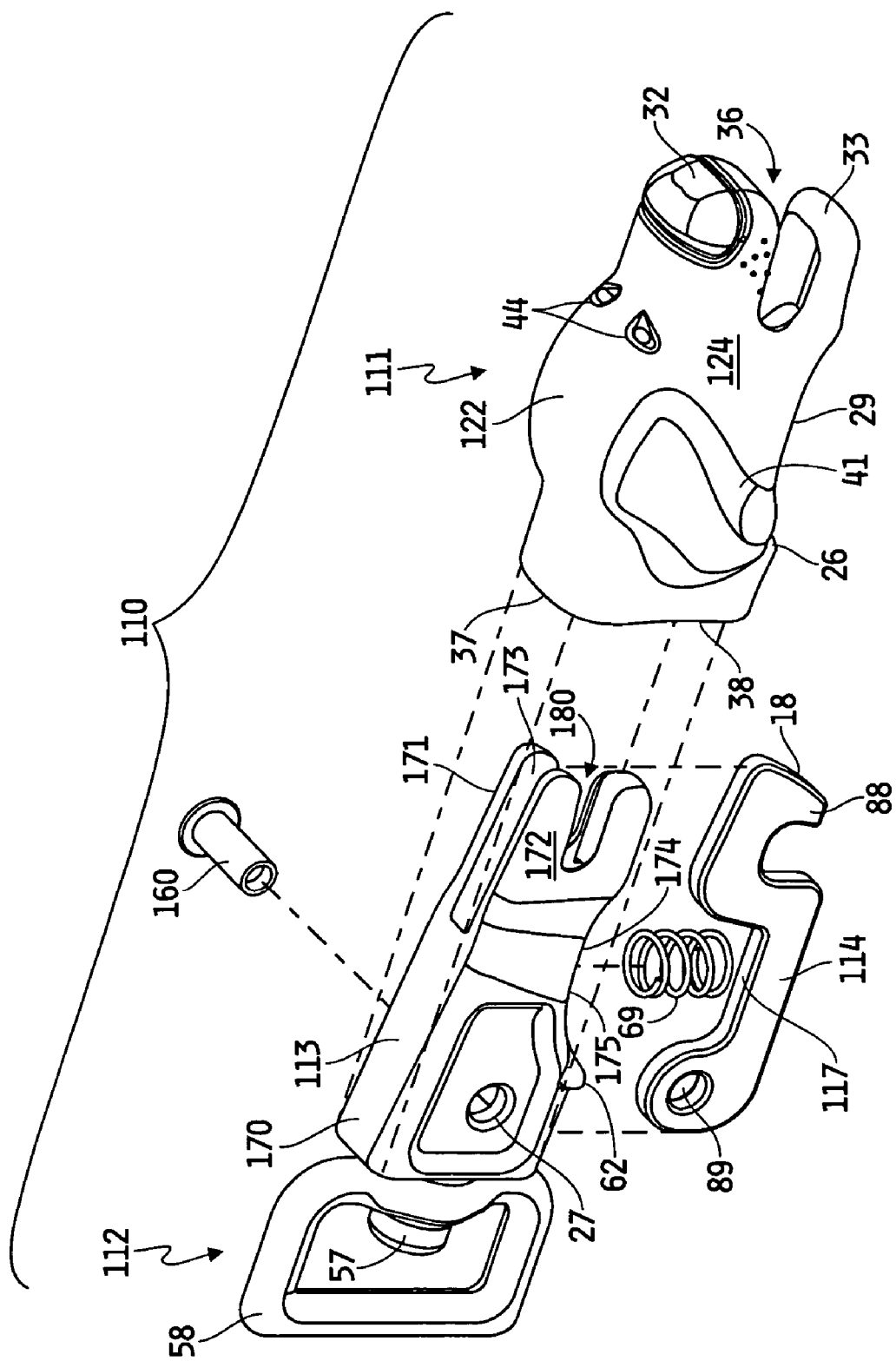
FIG. 9 is an exploded view of the illustrative embodiment of FIG. 6.
Figure 10:
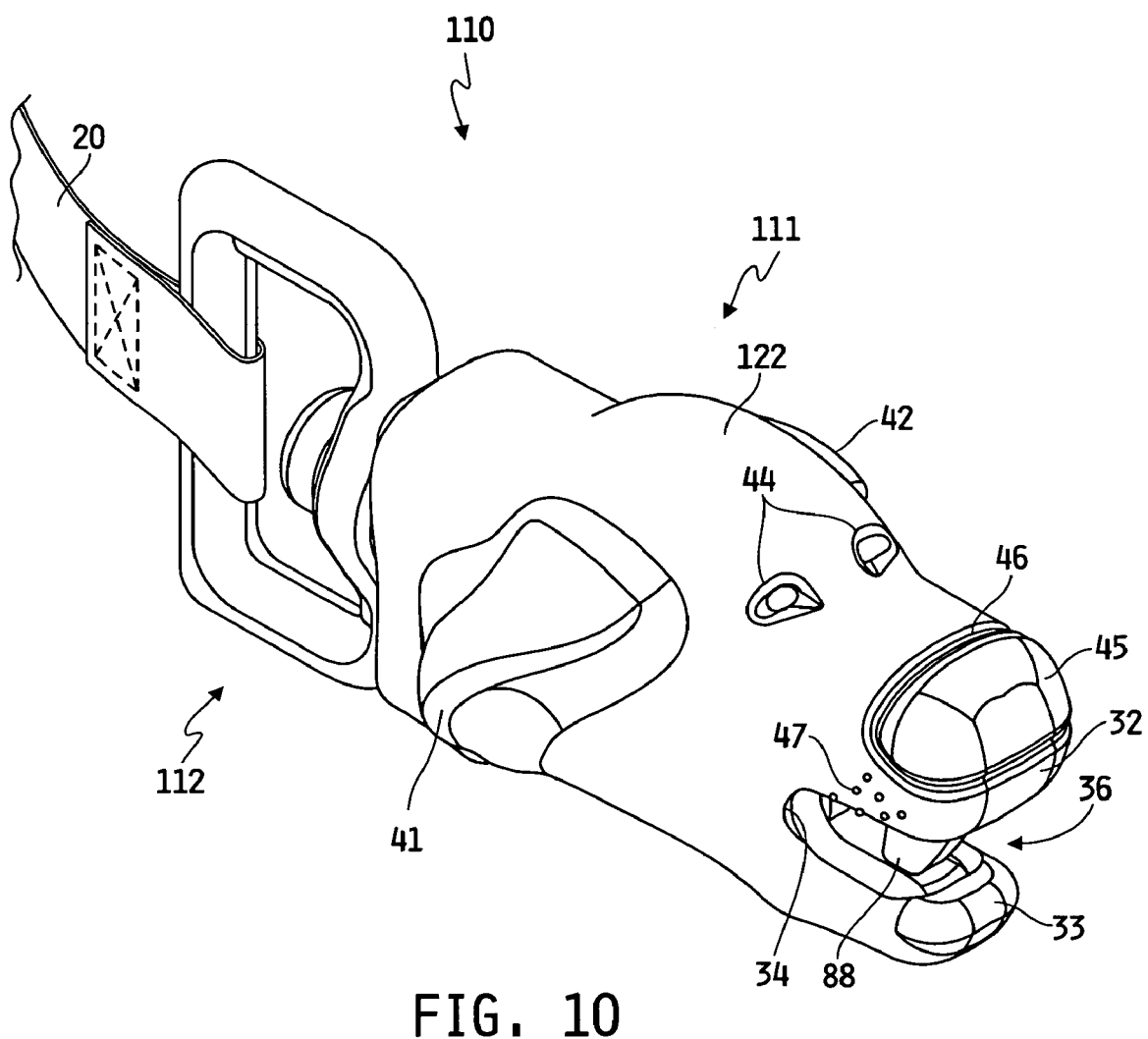
FIG. 10 is a perspective view of the illustrative embodiment of FIG. 6.

Illustratively, housing or cover 11, 111 is a generally monolithic piece of injection molded plastic having a generally rectangular shape and including a top surface 22, 122 a pair of spaced apart and generally parallel side surfaces 24, 124 and 25, 125, a bottom surface 28, 128 which is generally parallel to and spaced apart from top surface 22, and an end surface 30. Side surfaces 24, 124 and 25, 125 are generally perpendicular to top surface 22, 122, bottom surface 28, 128 and end surface 30, which generally extends between top surface 22, 122 and bottom surface 28, 128. As best seen in FIGS. 5-10, the cover 10, 110 may be formed in recognizable shapes. For example, the illustrative embodiment of FIG. 5 has surfaces formed to resemble a cat, such as for example and without limitation a prowler, a panther, a lion, a tiger, a puma, a mountain lion, a Siamese or other domesticated cat, and the like. The illustrative embodiment of FIGS. 6-10 has surfaces formed to resemble a dog. Examples of a dog's recognizable features include protrusions or ears 41 and 42, a pair of eyes 44, a nose 45, nose ridge 46, whisker indentations or holes 47, mouth 36, tooth 88, and rounded head or forehead portion of top surface 122 (FIGS. 9, 10). Such surfaces may be formed to resemble any species of dog, for example and without limitation, a Labrador retriever, a golden retriever, a beagle, a German shepherd, a dachshund, a Yorkshire terrier, a boxer, a poodle, a Shih Tzu, a Chihuahua, a schnauzer, a pug, a Pomeranian, a cocker spaniel, a rottweiler, a collie, a greyhound, a pincher, a Great Dane, a Saint Bernard, a Dalmatian, or any crossbreed or mixed breed such as for example a mongrel or a mutt, or any other dog, whether or not recognized by the American Kennel Club as an official breed. For example, and without limitation, the cover or housing 11, 111 may be formed to resemble any one of the following dogs or heads of the following dogs: An Aberdeen Terrier, an Affenpinscher, an Afghan Hound, an African Lion Hound, an African Wild Dog, an Aidi, an Ainu, an Airedale Terrier, an Akita, an Alaskan Malamute, an Alsatian, an American Black and Tan Coonhound, an American Bulldog, an American Cocker Spaniel, an American Foxhound, an American Pit Bull, an American Pit Bull Terrier, an American Staffordshire Terrier, an American Toy Terrier, an Anglo-Francais, de Petite Vénerio, an Appensell Mountain Dog, an Appenzeller Sennenhund, an Arabian Greyhound, an Arctic Fox, an Arctic Husky, an Argentinian Grey Fox, an Argentinian Mastiff, Artesian Norman Bassett, an Australian Cattle Dog, an Australian Kelpie, an Australian Queensland Heeler, an Australian Shepherd, an Australian Terrier, an Austrian Pinscher, an Auvergne Pointer, an Azawakh Hound, a Balkan Hound, a Balkasaki Gonic, a Barb, a Barbet, a Barbone, a Basenji, a Bas Rouge, a Basset Artésian Norsmand, Basset Bleu de Gascogne, a Basset Fauve de Bretagne, a Basset Hound, a Bavarian Mountain Hound, a Bayrischer Gebirgsschweisshund, a Beagle, a Bearded Collie, a Beauceron, a Bedlington Terrier, a Belgian Cattle Dog, a Belgian Griffon, a Bergamasco, a Berger de Beauce, a Berger de Brie, a Berger de Picard, a Berner Laufhund, a Berner Sennenhund, a Bernese Hound, Bernese Mountain Dog, a Bichon Bolognese, a Bichon Friese, a Bichon Havanais, a Bichon Maltiase, a Billy, a Bingley Terrier, Björnhund, a Black and Tan Coonhound, a Black and Tan Terrier, a Black Fell Terrier, a Black Norwegian Elkhound, Bloodhound, a Blue Gascony Basset, a Blue Heeler, a Blue Picardy Spaniel, a Bluetick Coonhound, a Bobtail, a bohemian Terrier, a Bolgnese, a Border Collie, a Border Terrier, a Borzoi, a Boston Terrier, a Bouledogue Français, a Bourbonnais Pointer, a Bouvier des Flandres, a Boxer, a Bracco Italiano, a Braque d'Auvergne, a Braque Français de Grande Taille, a Braque St. Germain, a Brazilian Mastiff, a Briard, a Briquet, a Briquet Griffon Vendéen, a Brittany, a Brokenhaired Scottish Terrier, a Brushwood Dog, a Brussels Griffon, a Bulldog, a Bullmastiff, a Bull Terrier, a Bush Dog, a Ca de Bestiar, a Ca de Bou, a Cairn Terrier, a Canaan Dog, a Canary Dog, a Cane da Pastore Bergamasco, a Cane de Quirinale, a Caniche, a Canidae, a Cão da Serra de Aires, a Cão da Serra da Estrela, a Cão de Agua, a Cão de Castro Laboreiro, a Cape Fox, a Cardigan Welsh Cori, a Carlin, a Carolina Dog, a Catahoula Hog Dog, a Catahoula Leopard Dog, a Catalan Sheepdog, a Cavalier Kin Charles, a Chesky Terrier, a Chesapeake Bay Retriever, a Chien d'Artois, a Chien de Franche-Comte, a Chien de l'Atlas, a Chien de Pays, Chien des Pyrénées, a Chien Loup, a Chihuahua, a Chin, a Chinese Crested Dog, a Chinook, a Chow Chow, a Chrysanthemum Dog, Cirneco dell'Etna, Clumber Spaniel, Cocker Spaniel, a Colpeo Fox, a Congo Dog, a Continental Phalene, a Continental Toy Spaniel: Phalene, a Corsac Fox, a Coton de Tulear, a Coyote, a Crab-eating Fox, a Cruft, Charles, a Curley-coated Retriever, a Czesky, a Czesky Fousek, a Dalmatian, a Dandie Dinmont Terrier, a Deerhound, a Deutsche Dogge, a Deutcher Drahthaariger Vorstehhund, a Deutscher Gross Spitz, a Deutscher Jagdterrier, a Deutscher Mittel Spitz, a Deutscher Schäferhund, a Deutscher Wachtelhund, a Deutsche Spitz, a Dhokhi Apso, a Dhole, a Dingo, A Dobermann, a Doberman Pinscher, a Dogo Argentino, a Dogue de Bordeaux, a Drentse Partijshond, a Drever, a Drótszörü Magyar Vizsla, a Dunker, a Dutch Partridge Dog, a Dutch Sheepdog, a Dutch Shepherd Dog, a Dutch Spaniel, an East Siberian Laika, an Elkhound, an English Beagle, an English Bull Terrier, an English Cocker Spaniel, an English Coonhound, an English Foxhound, an English Setter, an English Springer Spaniel, an English Toy Terrier, an Entelbucher, an Entelbuch Mountain Dog, an Epagneul Bleu de Picardie, an Epagneul Breton, an Epagneul Français, an Epagneul Nain, an Epagneul Picard, an Epagneul Pont-Audemer, an Eskimo Dog, an Esquimaux, an Estrela Mountain Dog, an Eurasian, an Eurasier, a Fennee Fox, a Field Spaniel, a Fila Brasileiro, a Finnish Hound, a Finnish Lapphund, a Finnish Spitz, a Finsk Spets, Flat-coated Retriever, French Bulldog, French Mastiff, French Spaniel, Friaar Dog, a Galgo Español, a Gammel Dansk Honsehund, a Gazelle Hound, a German Hunting Terrier, a German Pinscher, a German Shepherd Dog, a German Spaniel, a German Spitz: Klein, a German Spitz: Mittel, a German Wire-haired Pointer, a Giant German Spitz, a Giant Schnauzer, a Glen of Imaal Terrier, a Golden Jackal, a Golden Retriever, a Gordon Setter, a Gos d'Atura Catala, a Grand Basset Griffon Vendéen, a Grand Bleu de Gascogne, a Grand Gascon Saintongeois, a Grand Griffon Vendéen, a Great Dane, a Great Pyrenees, a Great Swiss Mountain Dog, a Greenland Dog, a Gray Fox, a Greyhound, a Gray Wolf, a Griffon Belge, a Griffon Bruxellois, a Griffon d'Arrêt á Poil Laineux, a Griffon Fauve de Bretagne, a Griffon Nivernais, a Groenendael, a Grønlandshund, a Grosser Münsterländer Vorstehhund, a Grosser Schweizer Sennenhund, a Grülandshund, a Halden Hound, a Haldenstövare, a Hamilton Hound, a Hamiltonstövare, a Hanoverian Mountain Hound, a Hanoverian Schweisshund, a Harrier, a Havanese, a Heidewachtel, a Hoary Fox, a Hokkaido Dog, a Hollandse Herdershond, a Hovawart, a Hungarian Greyhound, a Hungarian Mudi, a Hungarian Puli, a Hungarian Vizsla, a Husky, a Hygenhound, a Hygenhund, an Ibizan Hound, an Iceland Dog, an Icelandic Sheepdog, an Illyrian Sheepdog, an Inca Hairless, an Indian Fox, an Irish Red and White Setter, an Irish Red Terrier, an Irish Setteran Irish Terrier, an Irish Water Spaniel, an Irish Wolfhound, an Island Gray Fox, an Istrian Sheepdog, an Italian Greyhound, an Italian Hound, an Italian Pointer, and Italian Spinone, a Jack Russell Terrier, a Jäthund, a Japanese Akita, a Japanese Chin, a Japanese Small-sized Dog, a Japanese Spaniel, a Japanese Spitz, a Japanese Terrier, a Jugoslavenski Planinski Gonic, a Jugoslavenski Tribarvni Gonic, a Jura Hound, a Jura Laufhund: Bruno, a Jura Laufhund: St. Hubert, a Kai Dog, a Karelian Bear Dog, a Karelian Bear Laika, a Karjalankarhukoira, a Karst Sheepdog, a Keeshond, a Kelb Tal-fenek, a Kelef K'naani, a Kelpie, a Kennel Club, a Kerry Beagle, a Kerry Blue Terrier, a King Charles Spaniel, a Kit Fox, a Kleiner Münsterländer, a Komondor, a Kooiker Dog, a Kooikerhondje, a Korthals Griffon, a Krasky Ovcar, a Kromfohrländer, a Kuvasz, a Kyi Leo, a Labrador Retriever, a Lackense, a Laekenois, a Lakeland Terrier, a Lancashire Heeler, a Landseer, a Lapinkoira, a Lapinporokoira, a Lapland Reindeer Dog, a Lapplandska Spets, a Large Blue Gascony Hound, a Large French Pointer, a Large Münsterländer, a Large Vendéen Griffon, a Leonberger, a Lhasa Apso, a Little Lion Dog, a Löwchen, a Lucernese Hound, a Lundehund, a Lurcher, a Luzerner Laufhund, a Magyar Agár, a Magyar Vizsla, a Malinois, a Maltese, a Manchester Terrier, a Maned Wolf, a Maremma Sheepdog, a Mastiff, a Mastin Español, a Mastino Napoletano, a Medium Portuguese Hounds, a Medium Vendéen Griffon, a Mexican Hairless, a Miniature Bull Terrier, a Miniature Dachshund, a Miniature Pinscher, a Miniature Poodle, a Miniature Schnauzer, a Mops, a Mudi, a Neapolitan Mastiff, a Newfoundland, a New Guinea Singing Dog, a Nordic Spitz, a Norfolk Terrier, a Norrbottenspets, a Norsk Buhund, a Norsk Elghund (Grå), a Norsk Elghund (Sort), a Norwegian Buhund, a Norwegian Elkhound, a Norwegian Hound, a Norwegian Puffin Dog, a Norwich Terrier, a Nova Scotia Duck Tolling Retriever, an Ogar Polski, an Old Country Bulldog, an Old Danish Pointer, an Olde English Bulldogge, an Old English Sheepdog, an Ormskirk Terrier, an Österreichischer Kurzhaariger Pinscher, an Otterhoun, an Otter Hound, an Owczarek Podhalanski, a Pale Fox, a Papillon, a Pampas Fox, a Parson Jack Russell Terrier, a Pastore Abruzzese, a Patterdale Terrier, a Pekingese, a Pekingese Palasthund, a Pembroke Welsh Corgi, a Perdiguero de Burgos, a Perdiguero Portugueso, a Perro de Pastor Mallorquin, a Perro de Presa Canario, a Perro de Presa Mallorquin, a Perro Mastin del Pireneo, a Peruvian Inca Orchid, a Petit Basset Griffon Vendéen, a Petit Bleu de Gascogne, a Petite Brabancon, a Petit Griffon Bleu de Gascogne, a Pharaoh Hound, a Picardy Shepherd, a Picardy Spaniel, a Piccolo Levrieri Italiani, a Pit Bull Terrier, a Plott Hound, a Pocadan, a Podenco Ibicenco, a Podengo Portugueso Medio, a Podengo Portugueso Pequeño, a Pohjanpystykorva, a Pointer, a Polish Hound, a Polish Lowland Sheepdog, a Polski Owezarek Nizinny, a Pomeranian, a Pont-Audemer Spaniel, a Porcelaine, a Portuguese Cattle Dog, a Portuguese Pointer, a Portuguese Sheepdog, a Portuguese Watchdog, a Portuguese Water Dog, a Posavac Hound, a Posavski Gonic, a Pug, a Puli, a Pumi, a Pyrenean Mastiff, a Pyrenean Mountain Dog, a Raccoon Dog, a Rafeiro do Alentejo, a Redbone Coonhound, a Red Fox, a Red Setter, a Redtick Coonhound, a Red Wolf, a Reh Pinscher, a Rhodesian Ridgeback, a Riesenschnauzer, a Rothbury Terrier, a Rottweiler, a Rough Collie a Rüppell's Fox, a Russo European Laika, a Russian Retriever, a Russian Wolfhound, a Saarloos Wolfhound, a Sabueso Español, a St. Bernard, a St. Bernhardshund, a St. Germain Pointer, a St. Hubert Hound, a Saluki, a Samoyed, a Samoyedskaja, a Sar Planina, a Sarplaninac, a Schapendoes, a Schiller Hound, a Shcillerstövare, a Schipperke, a Schweizer Laufhund, a Scottish Deerhound, a Scottish Terrier, a Sealyham Terrier, a Sechura Fox, a Segugio Italiano, a Shar Pei, a Shetland Sheepdog, a Shiba Inu, a Shih Tzu, a Siberian Husky, a Sicilian Greyhound, a Side-striped Jackal, a Silky Terrier, a Silver-backed Jackal, a Simien Jackal, a Skye Terrier, a Sloughi, a Smålands Hound, a Smålandstövare, a Small-eared Dog, a Small-eared Fox, a Small French-English Hound, a Small Münsterländer, a Small Portuguese Hound, a Smooth Collie, a Smooth Fox Terrier, a Smooth-haired Collie, a Soft-coated Wheaten Terrier, a South American Fox, a Spanish Greyhound, a Spanish Hound, a Spanish Mastiff, a Spanish Pointer, a Spinone, a Spion, a Stabyhoun, a Staffordshire Bull Terrier, a Standard Pinscher, a Standard Poodle, a Suomenajokoira, a Suomenpystykorva, a Sussex Spaniel, a Swedish Dachsbracker, a Swedish Elkhound, a Swedish Lapphund, a Swedish Vallhund, a Swift Fox, a Swiss Hound, a Sydney Silky, a Tatta Mountain Sheepdog, a Tawny Brittany Basset, a Tawny Britanny Griffon, a Tazi, a Tencrife Dog, a Tepeizeulntli, a Tervuren, a Tibetan Mastiff, a Tibetan Sand Fox, a Tibetan Spaniel, a Tibetan Terrier, a Tora Dog, a Tosa Fighting Dog, a Tosa Inu, a Toy American Eskimo, a Toy Fox Terrier, a Toy Manchester Terrier, a Toy Poodle, a Treeing Walker Coonhound, a Tuareg Sloughi, a Vägŏtaspets, Virelade, a Volpino Italiano, a Vorstehhund, a Waterside Terrier, a Weimaraner, a Weimaraner Vorstehhund, a Welsh Springer Spaniel, a Welsh Terrier, a West Highland White Terrier, a West Siberian Laika, a Wetterhoun, a Whippet, a Wire Fix Terrier, a Wire-haired Pointing Griffon, a Wire-haired Vizsla, a Wolf Spitz, a Xoloitzcuintli, a Yellow Retriever, a Yorkshire Terrier, a Yugoslavian Mountain Hound, a Yugoslavian Tricolor Hound, a Zwergpinscher, a Zwergschnauzer, and a Zwergteckel. So too, the cover 11, 111 may be fashioned into any other type and species of animal, for example farm animals, wild animals, domesticated animals or fictional animals. The surfaces may resemble, for example, the mascots of sports teams, the characters of amusement parks or cartoons, the characters in fairy tales and the like. The surfaces may even resemble people, caricatures of people, super heroes, comic book characters, movie characters, cartoon characters and the like. The scope of the invention is meant to include any type of human, animal, terrestrial, fictional and/or inanimate shape, such as for example a boat, a car, a cycle, a building, and the like.

Surfaces 22, 24, 25, 28, 30, 122, 124, 125, 128 define a cavity 37 having an opening 38 through the end of the housing 11, 111 opposite from end surface 30. The other end of housing 11 defines an opening, notch, or mouth 36 having a seat 34 and configured to receive an anchor member such as for example a D-ring 16 (FIGS. 3A, 3B, 8A, 8B) or other suitable anchor member, coupling or connector. Illustratively, such a D-ring might be of the type found on an animal collar such as for example a dog or cat collar, or it might be a round bar found in the lower attachment of motor vehicles as mandated by Federal Motor Vehicle Safety Standards ("FMVSS") such as standard 213 codified at 49 C.F.R. §571.213, which is incorporated herein by reference. Mouth 36 opens through end surface 30 and side surfaces 24, 25, 124, 125 and conceptually divides end surface 30 into an upper portion 32 and a lower portion 33. Cavity 37 is generally though not necessarily rectangular in cross section, generally extends from the opening 38 to the mouth 36, and generally is sized to snugly receive therein the other components 12, 13, 14, 69, 112, 113, and 114 of the connector 10, 110. Cover or housing 11 also has a coupling aperture 27 formed to receive any conventional connector or fastener, such as for example mounting member 60, to secure the cover or housing 11 to and/or with the other components when assembled. As one of any number of suitable alternatives to the use of fasteners, cover 111 snaps into place without the need for any type of fastener. More specifically, bottom surface 128 includes a generally arcuate portion and has formed therethrough a void or opening 29, which is in communication with cavity 37 and which is bounded at its proximate end by edge or lip 26 formed in the bottom surface 128. When the cover 111 is slid over frame assembly 113, or the frame assembly slid into cover 111, edge or lip 26 retains frame assembly 113 in place by abutting locking protrusion or appendage 62 of the frame assembly 113. It is also within the scope of the disclosure for the cover 10, 110 and the frame assembly 13, 113 to be of unitary or monolithic construction.

It will be appreciated that the cover or housing 11, 111 need not be of monolithic construction and that it may be made of any suitable non-metallic, metallic, or composite materials, or a combination thereof if desired. For example and without limitation, all or a portion of the cover or housing 11, 111 may be made of graphite, titanium, zinc, aluminum, kevlar, and the like. In addition, the cover or housing 11, 111 may be manufactured using any process compatible with the material being used, such as, for example, injection molding, die casting, stamping, or the like. Moreover, the cover or housing 11, 111 may be manufactured using different colors or combinations of colors such as for example black, blue, purple, yellow, red, white, orange, brown, green, gray and various other colors and shade thereof. The cover or housing 11, 111 may be luminescent such that it glows in the dark.

Figure 4:
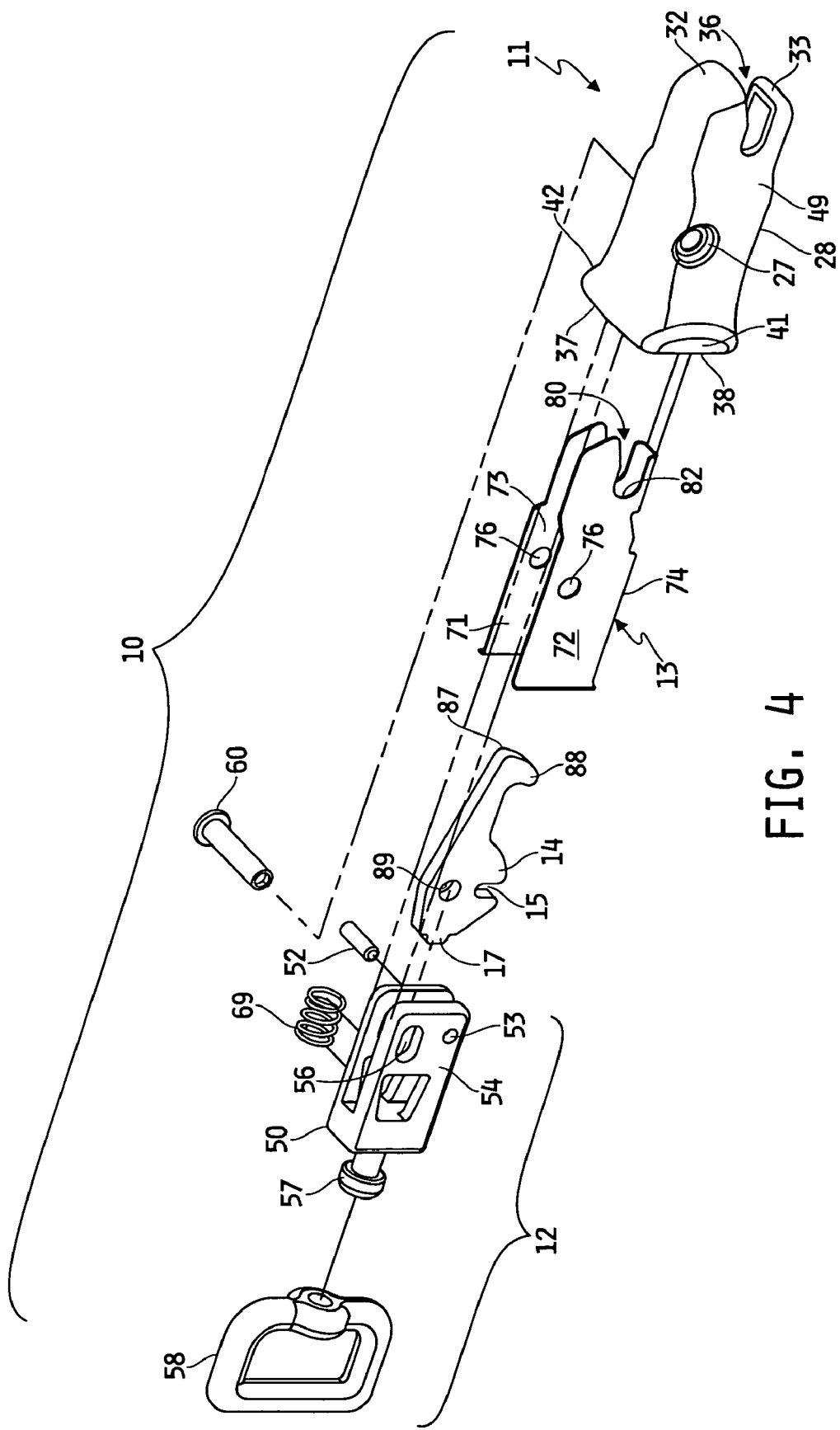
FIG. 4 is an exploded view of the illustrative embodiment of FIG. 1.

As best seen in FIG. 4, illustratively, the mounting assembly 12 of coupling device 10 generally comprises a frame 50 having a pair of spaced apart side walls or surfaces 54, 55 (FIG. 3A) and carrying an anchorage mount 57 with an anchorage 58 mounted thereto. Illustratively the frame 50 may but need not be of monolithic construction to include the anchorage mount 57. So too, the anchorage mount 57 and/or the side surfaces 54, 55 could be attached to the frame 50 by any suitable means, such as for example and without limitation by welding. A pair of generally aligned camming pin apertures 53 and a pair of generally aligned slots or channels 56 are defined through side walls 54 and 55. The camming pin apertures 53 are sized to receive therethrough a camming pin 52, which will be described below. The pair of slots or channels 56 are sized to receive therethrough mounting member 60 as will be explained herein below. The side walls 54 and 55 are spaced apart so as to receive and sandwich therebetween the lever 14, and a bias member 69, which may be for example and without limitation a spring 69, which spring 69 generally acts between the frame 50 and the lever 14 as will be explained herein below. Turning to coupling device 110, the mounting assembly 112 illustratively comprises an anchorage mount 57 with an anchorage 58 mounted thereto. Mounting assembly 112 may be attached to, or be integral with frame 113.

In either or both mounting assembly 12, 112, the anchorage 58, which for example and without limitation may be a D-ring, may be movably mounted to the anchorage mount 57. For example, the anchorage 58 may rotate or swivel generally about the longitudinal axis of anchorage mount 57. In addition, anchorage 58 and/or anchorage mount 57 may be detachable from the frame 13, 113 as desired. Referring to FIG. 10, the mounting assembly 12, 112 may be configured to attach or couple anchorage 58 to or with any manner of flexible, semi-flexible, semi-rigid or rigid elongate members or tethers 20, such as for example and without limitation, an animal or human leash, a web, a rope, a wire, a chain such as a key chain, or other suitable device or structure desired to be coupled to an anchor member. The tether 20 may be permanently, semi-permanently or releasably coupled to the anchorage through any suitable structure or method, such as for example and without limitation, sewing, snapping, clipping, riveting, gluing, hook and looping, bracketing, sliding association, and the like or any combination of the foregoing.

Frame 13, 113 is a generally monolithic structure illustratively having a substantially U-shaped transverse cross-section and is sized to fit snugly within cover 11, 111 and to receive therein the lever member 14, 114. The Frame 13, 113 may have upwardly extending sides as in the case of frame 13 of device 10 or be an inverse-U with downwardly extending sides as in the case, illustratively, of frame 113 of coupling device 110 or vice versa. Illustratively, as best seen in FIG. 4, frame 13 of coupling device 10 has a bottom surface 74, and a pair of spaced apart side surfaces or plates 71 and 72, which project upwardly from the bottom surface 74. The sides 71 and 72 each have a mounting aperture 76 configured to receive mounting member or fastener 60. Sides 71, 72 are spaced apart such that they fit within the housing or cover 11. The sides are also spaced apart so as to receive and sandwich therebetween the assembled mounting assembly 12 and its sub-components and the lever 14, which is received within the mounting assembly 12, as will be explained. Thus, the sides 54 and 55 of the mounting assembly nest between the upwardly extending sides 71, 72 of the frame 13, with the lever 14 nested between all sides 71, 72, 54, 55. The sides 71, 72 also define a mouth or notch 80 having a seat 82. The mouth 80 is sized to receive an anchor member, for example, the illustrative D-ring 16, which may be coupled to an animal's collar. The mouth may also be sized to receive other anchor members such as, for example, a loop in a web, or a suitable rigid member such as found in the lower anchorages in motor vehicles as mandated by FMVSS 213.

In contrast to the illustrative frame 13, frame 113, as best seen in FIG. 9, illustratively has a top surface 170 and a pair of generally downwardly projecting and spaced-apart side surfaces 171 and 172. Sides 171 and 172 are generally perpendicular to top surface 170 and bottom surface 174. Bottom surface 174 includes a generally arcuate-shaped portion and defines an opening or void 175 therethrough, which void 175 is in communication with or adjacent to void 29. The sides 171, 172 are also spaced apart so as to create a lever void 67 therebetween to receive and sandwich the lever 14. The void 67 is bounded by and in communication with the void 175, with top opening 173 formed through top surface 170, and with mouth 180 defined by sides 171, 172. Formed within lever void 67 is a bias void 68 sized to house the bias member 69. The mouth 180 is sized to receive an anchor member, for example, the D-ring 16 or other anchor member such as, for example, a loop in a web, or a suitable rigid member such as found in the lower anchorages in motor vehicles as mandated by for example FMVSS 213.

The frame 13, 113 may be made of any suitable metallic, non-metallic, or composite material, or combination thereof, and may be of monolithic, unitary, or non-monolithic construction. For example, frame sides 71 and 72 and/or 171 and 172 could be stand-alone plates coupled together using any standard coupling method, including welding, riveting, screwing, bolting, pinning and the like. As noted, though, the frame 13, 113 illustratively is of monolithic construction.

Lever 14, 114 is illustratively monolithic and made of metal and is sized to move relative to and inside the frame 13, 113 between sides 71 and 72, 171 and 172. Lever 14, 114 defines therethrough a mounting aperture or hole 89 configured to receive and move about mounting member 60. The distal end 87 of lever 14, 114 has a downwardly projecting tooth 88 having a leading or engagement edge 18. Tooth 88 illustratively is sized to cover the distal opening of mouths 36, 80, 180 when coupling 10, 110 is assembled and in its closed position as will be explained. Lever 14 illustratively includes between its proximate and distal ends the hole 89 and a rounded protrusion which defines camming pin recess 15, and at its proximate end a bias mount or engagement portion 17. Illustrative lever 114, in contrast, is generally S-shaped and includes between its proximate and distal ends a bias engagement portion 117 and a direct manipulation portion 19, and at or near its proximate end the mounting hole 89. It will be appreciated that the lever 14, 114 may be fashioned from any suitable metallic, non-metallic, or composite material, or any combination thereof, using any method of manufacture suitable to the material(s) being used. The lever may also be non-monolithic.

Figure 3A:
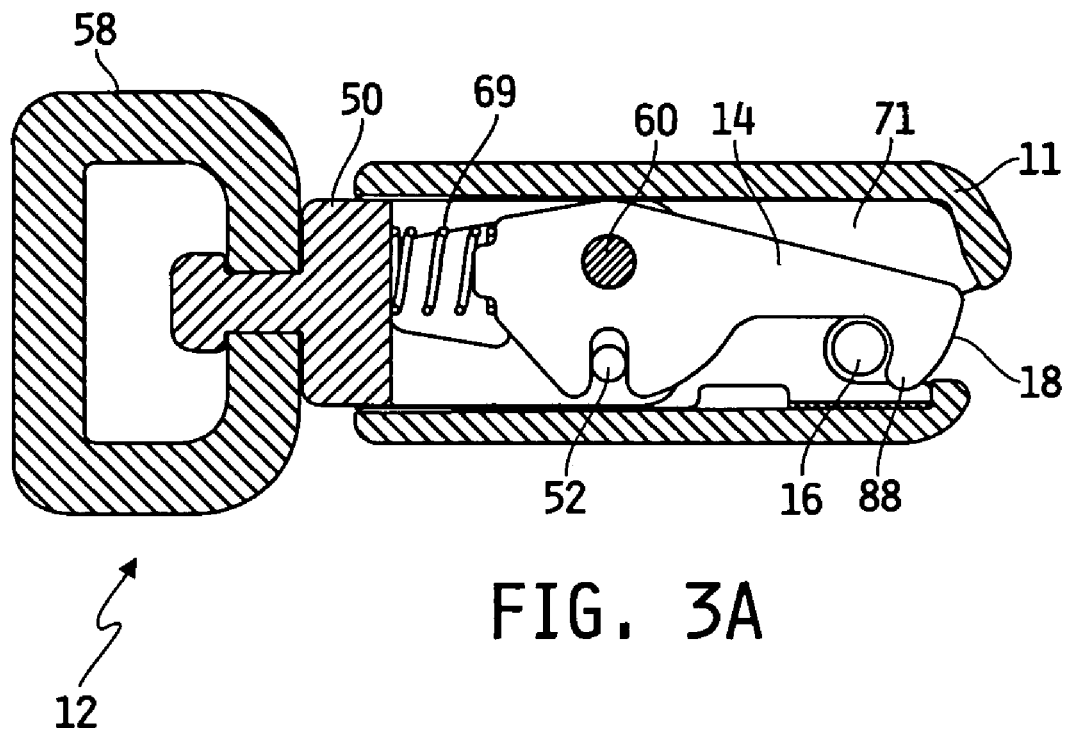
FIG. 3A is a side cross-sectional view of the illustrative embodiment of FIG. 1 in the closed position taken generally along the line 3-3.
Figure 3B:
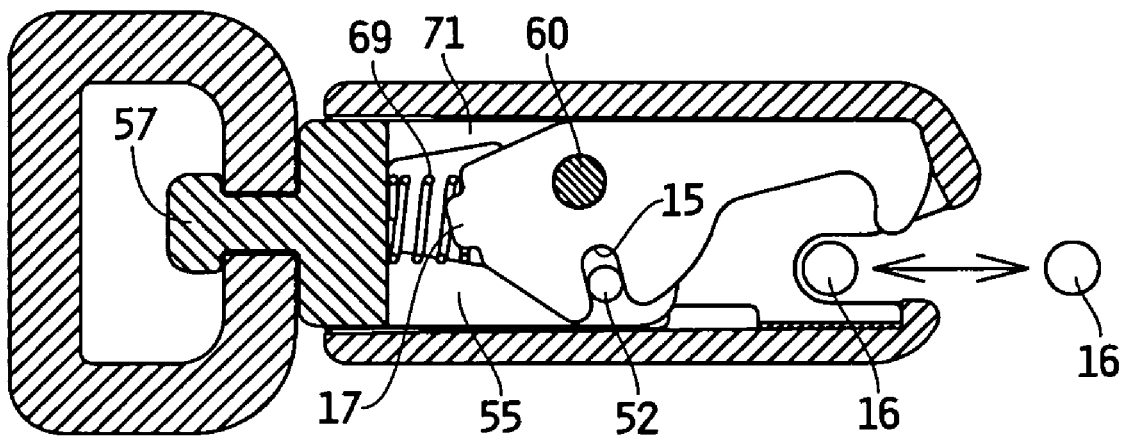
FIG. 3B is a side cross-sectional view of the illustrative embodiment of FIG. 1 in the opened position taken generally along the line 3-3.
Figure 8A:
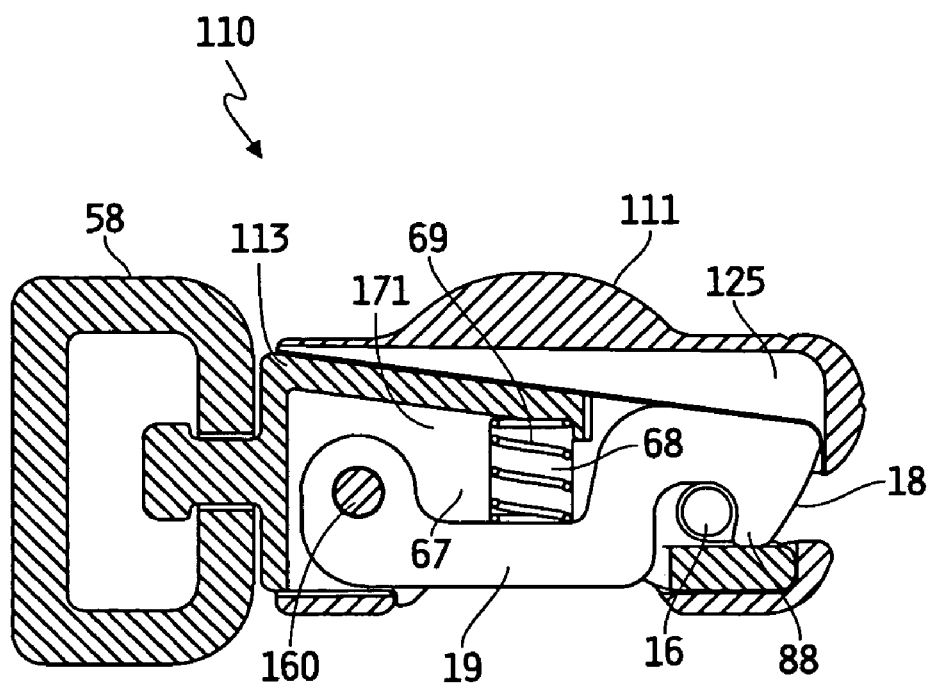
FIG. 8A is a side cross-sectional view of the illustrative embodiment of FIG. 6 in the closed position taken generally along the line 8-8.
Figure 8B:
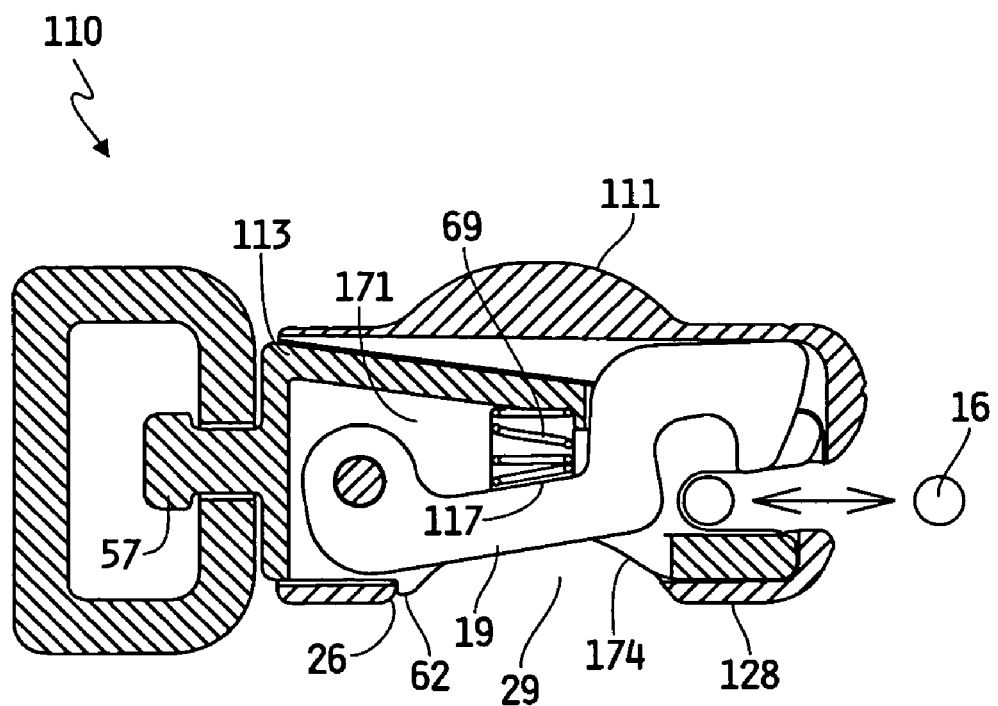
FIG. 8B is a side cross-sectional view of the illustrative embodiment of FIG. 6 in the opened position taken generally along the line 8-8.

As best seen in FIGS. 2, 3A, 5, 7, 8A and 10, lever 14, 114 illustratively has a normally closed position where the bias member or spring 69 urges the tooth 88 to substantially close or cover the mouths 36, 80, 180, and, as seen in FIGS. 3B and 8B an open position where the tooth 88 is substantially removed from the mouths 36, 80, 180. More specifically, in the normally closed position the biasing member 69 urges the lever 14, 114 in a generally downwardly slope toward the respective bottom surfaces 28, 74, 128, 174 thereby substantially closing off the respective mouth(s) 36, 80, 180 with tooth 88. In the open position, the lever 14 is moved into a generally upwardly sloping configuration relative to the bottom surfaces 28, 74, 128, 174 thereby moving the tooth 88 substantially out of the way of respective mouth(s) 36, 80, 180. It will be appreciated the device 10, 110 could be configured to reverse the closed and open positions such that the lever 14, 114 and tooth 88 are normally urged upwardly to substantially cover the respective mouth(s) 36, 80, 180 and are movable downwardly to substantially uncover the respective mouth(s) 36, 80, 180. So too, horizontal or oblique movements of the lever 14, 114 to move between open and closed positions are within the knowledge of those skilled in the art and are desired to be protected. In any event, lever 14, 114 and tooth 88 may be cammed or moved to the open position, to substantially uncover respective mouths 36, 80, 180 by applying pressure to, or engaging the respective lever's 14, 114 leading or engagement edge 18. For example, the device 10, 110 may be urged, pressed or pushed onto an anchor member, for example anchor member 16, which impinges the engagement edge 18 of the tooth 88 and overcomes the bias force of biasing member 69 to cam or move the lever 14, 114 out of the way of the respective mouth(s) 36, 80, 180, either upwardly or downwardly, or otherwise, depending on how the device 10, 110 is configured. So too, the anchor member may be pressed into engagement with the engagement edge 18, or the coupling device 10, 110 and the anchor member 16 could be urged one against the other into engagement as desired. While both levers 14 and 114 may be cammed or moved to the open position as just described, each has at least one alternative way to be moved to the open position, and each may be urged into the closed position in alternative ways as will now be described in turn.

Figure 5:
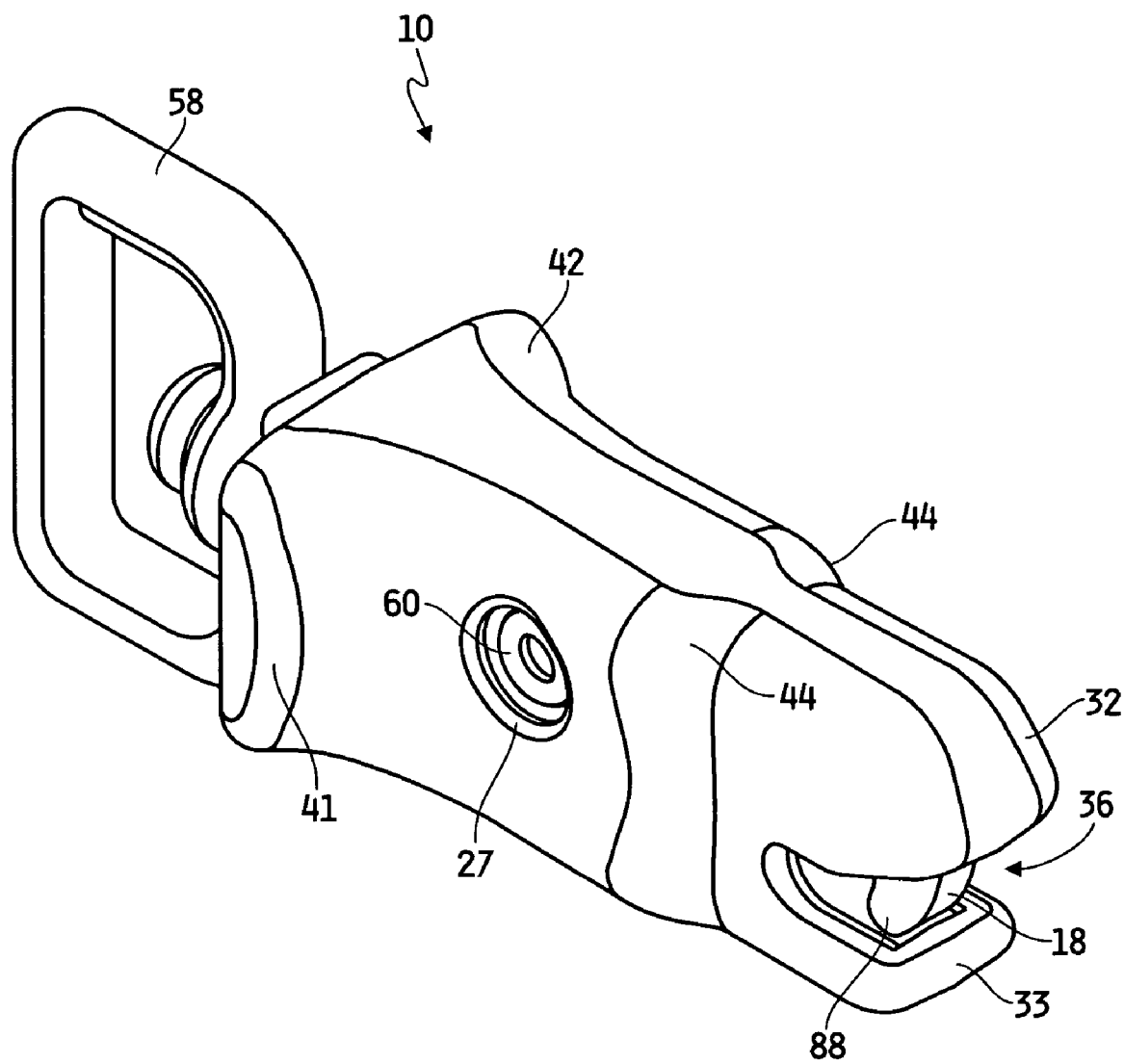
FIG. 5 is a perspective view of another illustrative embodiment of the disclosure.
Figure 6:
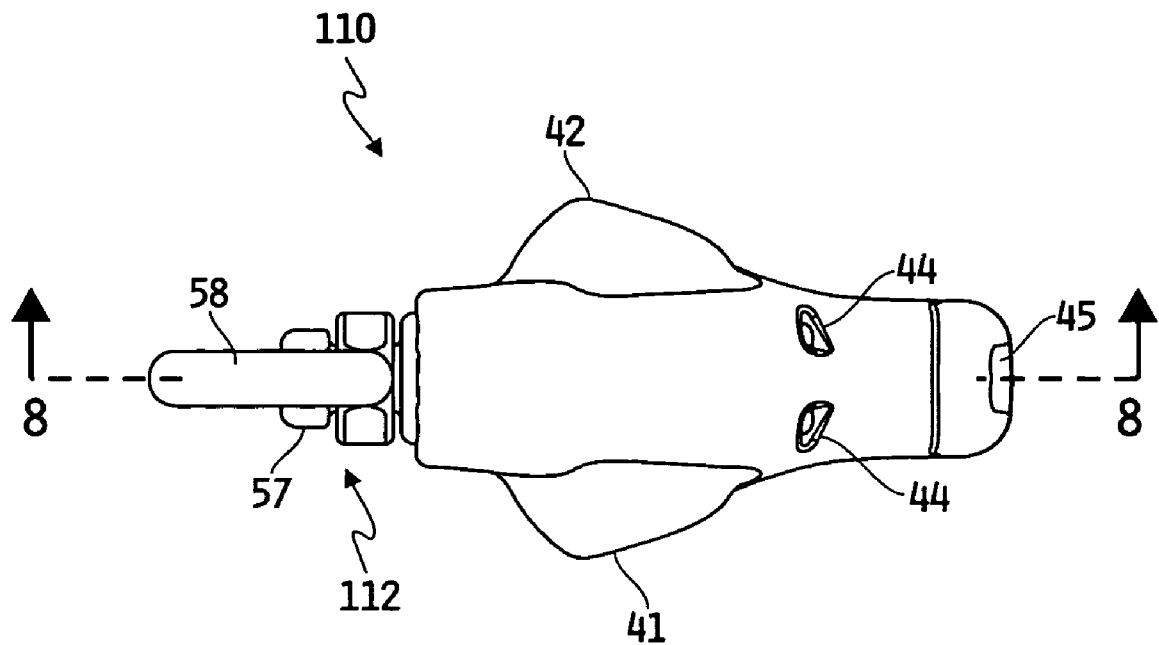
FIG. 6 is a top plan view of another illustrative embodiment of the disclosure.
Figure 7:
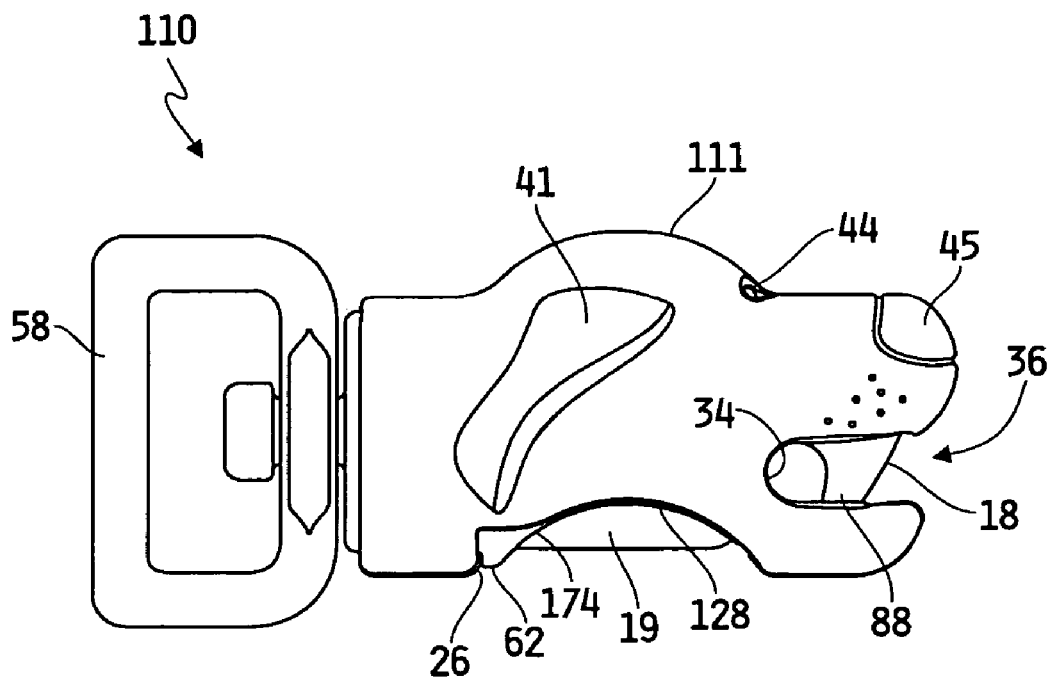
FIG. 7 is a side elevation view of the illustrative embodiment of FIG. 6.

Referring to FIGS. 1-5, coupling device 10 is generally constructed and operates as follows. In its assembled configuration, as shown in FIG. 5, device 10 has nestled inside of cover 11, the mounting assembly 12, the frame assembly 13 and the lever 14. The lever 14 is sandwiched between side walls or surfaces 54 and 55, with spring 69 mounted to, or in contact at one end with bias mount 17 and in contact at the other end with frame 50. Fastener or mounting member 60 extends through coupling apertures 27 in the cover 11, mounting apertures 76 in the frame 13, mounting channels 56 in the mounting assembly 12 and mounting hole 89 located between the proximate and distal ends of lever 14 to movably mount the lever to the mounting assembly 12 and to fasten together the cover 11, the mounting assembly 12, and the frame assembly 13. Camming pin 52 extends through camming apertures 53 and camming pin recess 15.

In operation, spring 69 normally biases the lever 14 into the closed position, illustratively downwardly and somewhat forwardly, by acting between the frame 50 of mounting assembly 12 and the lever 14. It will be appreciated that the mounting assembly 12 and the frame assembly 13 could also be a unitary assembly. In any event, by coupling the two assemblies 12 and 13 together, they act as a unitary assembly such that the spring 69 is also acting between the lever 14 and the frame assembly 13. In addition to engaging the engagement edge 18 to cam the lever 14 to the open position as described above, the lever 14 may be moved to the open position through internal camming as follows. Illustratively, lever 14 may be cammed or moved from the closed position to the open position by a user gripping and applying pressure to one or more protrusions on the cover 11, such as for example the ears 41 and 42 or the upper surface 22 or forehead of the head in the vicinity of the eyes 44, while applying an opposite pressure to the proximate end of the device 10, for example to the mounting assembly 12, which will move forwardly within and with respect to the frame assembly 13 as the mounting member 60 moves within the channels 56. The camming pin 52 will move with the mounting assembly 12 in order to contact with the sides of the camming pin recess 15 to cam or move the lever 14 to uncover the mouth. This internal camming process will not only allow extraction of, or disengagement with an anchor member 16, but also will allow insertion of an anchor member 16 into the mouth(s) 36, 80.

Referring to FIGS. 6-10, coupling device 110 is generally constructed and operates as follows. In its assembled configuration, as shown in FIG. 10, device 110 has nestled inside of cover 111, the frame assembly 113 and the lever 114. The portions of the frame assembly 113 that define mouth 180 are sized to fit within the upper portion 32 and the lower portion 33 of cover 111 in order to align and place in communication with each other mouth 180 and mouth 36. As noted above and shown in FIG. 9, the mounting assembly 112 may be mounted directly to the frame assembly 113 forming a unitary frame, or the two assemblies 112 and 113 may form a monolithic frame. Illustratively, the lever 114 is generally S-shaped and is sandwiched between side walls or surfaces 171 and 172. The bias member or spring 69 is disposed within cavity 68 defined within the void 67 formed between the sides 171, 172. In the closed position, the direct manipulation portion 19 of lever 114 protrudes through openings 29 and 175. Fastener or mounting member 160 extends through coupling apertures 27 in the frame 113 and mounting hole 89 in the vicinity of the proximate end of lever 114 to movably mount the lever to the frame 113. It will be appreciated that mounting member 160 could also pass through the cover 111 in order to mount together the cover 111 and the frame assembly 113 in lieu of the illustrative snap-on embodiment. Also, the cover 111 could both be snapped onto the frame 113 and fastened together therewith by mounting member 160. So too, the cover 111 and frame 113 could be of monolithic construction.

In operation, spring 69 illustratively acts between top wall of frame assembly 113 and the spring mount or contact portion 117 of the lever 114 to urge the lever to the closed position so that the tooth 88 substantially covers or closes the mouth 36, 180. As described above and known to those skilled in the art, the engagement edge 18 may be engaged with an anchor member to cam or move the lever 114 to the open position. In addition, the lever 114 may be moved to the open position through direct manipulation as follows. Illustratively, lever 114 may be moved from the closed position to the open position by a user gripping and applying pressure to one or more protrusions on the cover 111, such as for example the ears 41 and 42 or the upper surface 122 or forehead of the head in the vicinity of the eyes 44, while applying pressure to the manipulation portion 19 of the lever 114. If desired, a user could also grasp at least a portion of the mounting assembly 112 when applying pressure to the manipulation portion 19. The pressure applied to the manipulation portion 19 illustratively will be generally opposite to the bias force of the spring 69 in order to move the lever 114 and its tooth 88 out of the closed position. Illustratively, the arcuate bottom surfaces 128, 174 allow the lever to be moved or pivoted by direct manipulation to the degree necessary to uncover the mouth 36, 180. As the lever 114 is moved to the open position, its distal end moves through the top opening defined in top surface 170. It will be appreciated, as noted above, that the open and closed positions could be reversed. In any event, the direct movement of the lever 114 out of the closed position will not only allow extraction of, or disengagement with an anchor member 16, but also will allow insertion of an anchor member 16 into the mouth(s) 36, 180 as one alternative to camming engagement. As shown in FIG. 10, another device or object, such as a leash or other suitable elongate member 20, may be coupled or attached to anchorage 58 if desired.

Not only does the housing or cover 11, 111 aid in the manual movement of lever 14, 114 to the open position by providing gripping protrusions in the form of ears 41 and 42, and forehead or top surface 22, 122 and eyes 44, but it also may protect the lever 14, 114 from dust, from chipping, and the like. In addition, anatomically correct or representative protrusions such as the ears 41, 42, forehead or top surface 22, 122, and eyes 44 allow a user to simultaneously maintain a grip on the coupling device 10, 110 while moving the lever 14, 114 to the open position in order to disengage the device 10, 110, even as such disengagement is being resisted. For example, an animal with a leash attached by the coupling device 10, 110 to the D-ring 16 anchor member on the animal's collar, might pull away from the coupling device 10, 110 as a user attempts to disconnect the coupling device 10, 110 from the animal. The mouth 36, 80, 180 with its dangling tooth 88 helps a user, even a child, intuitively know where to insert the anchor member 16 and aids in such insertion by guiding the anchor member into engagement. The cover 11, 111 also may help distinguish, by feel and/or by sight, one device, such as a leash or key chain, from another. For example, feel alone may help a user distinguish the leash for the collie from the leash for the schnauzer, or the keys for the Cadillac from the keys to the Mustang. So too, quick recognition by sight of the appropriate leash is facilitated by the recognizable shape and/or color of the cover 11, 111. The cover or housing may also provide temperature resistance from the bare metal of the frame assembly 13, 113 and/or mounting assembly 12, 112, if these assemblies are chosen to be made from metal, which they need not be. The cover also may protect finger nails. In addition to these many utilitarian aspects of the cover 11, 111, it also offers an aesthetically pleasing appearance. As already noted, each such cover or housing 11, 111 may be interchangeable one with the other as desired. For example, a particular connector device 10, 110 might have a housing or cover 11, 111 resembling a dog which may be removed and replaced with a different housing or cover 11, 111 resembling a cat. In another example, a blue housing or cover resembling a cocker spaniel might be replaced with a red housing or cover resembling a cocker spaniel or with a blue housing or cover resembling a bulldog. The cover may be configured with an illumination device and/or a sound chip to simulate, for example barking, meowing, purring, etc. Illustratively, the light from the illumination device could emanate from the eyes 44 and the sound from the sound chip could emanate from the mouth 36.

While the invention has been illustrated and described in detail in the drawings and foregoing description, the same is to be considered as illustrative and not restrictive in character, it being understood that one skilled in the art will recognize, and that it is desired to protect, all aspects, changes and modifications that come within the spirit of the invention.

What is claimed is:

1. A coupling device for engaging an anchor member, the coupling device comprising:

a frame defining a top wall and a pair of juxtaposed sides extending downwardly from the top wall to a bottom surface, the frame defining a mouth between the top wall and the bottom surface at one end thereof and an opposite end, the mouth defining an opening thereto, the bottom surface defining an opening between the mouth and the opposite end of the frame, the opening in the bottom surface opening to a void defined between the sides of the frame that is separate from the mouth, and a lever movably mounted to the frame at a mounting location, the lever having a distal end that is movable relative to the frame between a first position in which the distal end of the lever covers the opening of the mouth and a second position in which the distal end of the lever does not cover the opening of the mouth, the lever defining a manipulation portion between the mounting location and the distal end that extends through and below the opening in the bottom surface of the frame when the distal end is in the first position, the manipulation portion responsive to a direct pushing force applied thereto to extend through the opening in the bottom surface of the frame and into the void defined between the sides of the frame when the lever moves from the first position to the second position, and a biasing member positioned in the void defined between the sides of the frame, the biasing member extending between the top wall of the frame and the lever, the biasing member biasing the lever toward the first position.

2. The coupling device of claim 1 wherein the biasing member contacts one surface of the manipulation portion of the lever.

3. The coupling device of claim 1 wherein the top wall of the frame defines an opening therethrough separate from the mouth, and wherein the distal end of the lever extends through and beyond the opening defined in the top wall of the frame when the lever is moved from the first position to the second position.

4. The coupling device of claim 1 further comprising a cover configured to receive the frame and lever therein, the cover defining a first opening therein that aligns with the mouth defined by the frame when the frame is received within the cover such that the mouth defined by the frame is accessible through the first opening defined by the cover when the frame and lever are received within the cover.

5. The coupling device of claim 4 wherein the cover defines a second opening therein that aligns with the opening defined in the bottom surface of the frame when the frame and lever are received within the cover such that the manipulation portion of the lever extends outwardly away from the second opening defined in the cover when the distal end of the lever is in the first position.

6. The coupling device of claim 4 wherein the cover comprises a plurality of external surfaces that are formed in the shapes of corresponding portions of a head of an animal.

7. The coupling device of claim 6 wherein the plurality of external surfaces are formed in the shapes of corresponding portions of a head of a dog.

8. The coupling device of claim 6 wherein the plurality of external surfaces are formed in the shapes of one or more of a pair of ears, a pair of eyes, a nose, a nose ridge, whisker indentations, a rounded head and a rounded forehead, of the animal.

9. The coupling device of claim 4 wherein the mouth defined by the cover is formed in the shape of a mouth of an animal and the distal end of the lever is formed in the shape of a tooth of the animal.

10. The coupling device of claim 9 wherein the mouth defined by the cover is formed in the shape of a mouth of a dog and the distal end of the lever is formed in the shape of a tooth of the dog, and wherein the cover comprises a plurality of external surfaces that are formed in the shapes of corresponding portions of a head of the dog.

11. The coupling device of claim 10 wherein the plurality of external surfaces are formed in the shapes of one or more of a pair of ears, a pair of eyes, a nose, a nose ridge, whisker indentations, a rounded head and a rounded forehead, of the dog.

12. The coupling device of claim 11 wherein the cover has a color.

13. The coupling device of claim 12 wherein the color is selected from the group consisting of red, orange, yellow, green, blue, black, brown, white, magenta, cyan, violet, purple, tan, pink, and beige.

14. The coupling device of claim 1 further comprising a mounting assembly mounted to the opposite end of the frame, the mounting assembly configured to attach to any of a flexible, semi-flexible, semi-rigid and rigid elongate member.

15. The coupling device of claim 1 wherein the biasing member comprises a spring.

16. The coupling device of claim 15 wherein the spring has an end opposite to the distal end that is movably mounted to the frame at the mounting location, and wherein the spring contacts the lever between the distal end of the lever and the end opposite to the distal end of the lever.

* * * * *